United States Patent
Lodge, Kevin J. et al.

[11] Patent Number: 5,275,328
[45] Date of Patent: Jan. 4, 1994

[54] METHODS OF JOINING COMPONENTS

[75] Inventors: Lodge, Kevin J., Daventry; Kevin Bass, Towcester; Elizabeth A. Logan, Lighthorne, all of England

[73] Assignee: GEC-Marconi Limited, England

[21] Appl. No.: 964,193

[22] Filed: Oct. 21, 1992

[30] Foreign Application Priority Data

Nov. 4, 1991 [GB] United Kingdom ............... 9123336

[51] Int. Cl.$^5$ .............................................. B23K 1/20
[52] U.S. Cl. .................................... 228/118; 228/209
[58] Field of Search ................. 228/209, 124, 118; 219/121.64, 121.6, 121.63

[56] References Cited

U.S. PATENT DOCUMENTS

| | | | |
|---|---|---|---|
| 4,023,005 | 5/1977 | Bolin | 219/121.64 |
| 4,418,857 | 12/1983 | Ainslie et al. | 228/124 |
| 4,603,805 | 8/1986 | Rogers | 228/209 |
| 4,620,661 | 11/1986 | Slatterly | 228/209 |
| 4,642,446 | 2/1987 | Pennington | 219/121.64 |
| 4,697,061 | 9/1987 | Spater et al. | 219/121.64 |
| 4,763,828 | 8/1988 | Fukaya et al. | 228/124 |
| 4,921,157 | 5/1990 | Dishon et al. | 228/180.2 |
| 5,183,991 | 2/1993 | Arai | 219/121.64 |

FOREIGN PATENT DOCUMENTS

2059323  4/1981  United Kingdom ............... 228/124

OTHER PUBLICATIONS

Patent Abstracts of Japan, vol. 14, No. 584 (E-1018), Dec. 27, 1990 and JP-A-22 54 780 (Fuji Electric Co. Ltd.) Oct. 15, 1990.
Patent Abstracts of Japan, vol. 3, No. 83 (C-52) Jul. 18, 1989 and JP-A-54-060 249 (Toshiba Corp) May 15, 1979.
Patent Abstracts of Japan, vol. 5, No. 123 (M-82), Aug. 8, 1981 and JP-A-56-062688 (Toshiba Corp) May 28, 1981.
J. Vac. Sci. Tech. A,3(3), May/Jun. 1985, pp. 780-781.
Proceeding of International Symposium for testing and failure analysis, 990, pp. 225-230, "Corrosion within a high-rel hybrid switch: Analysis and Repair", R. S. Torkington, et al.

*Primary Examiner*—Paula A. Bradley
*Assistant Examiner*—Chuck Y. Mah
*Attorney, Agent, or Firm*—Kirschstein

[57] ABSTRACT

This method enables two components (1, 3) to be joined by soldering using heat generated by a laser beam, without the use of flux. A layer (5) of a material which has a lower melting point than the material of one of the components (3) is formed on that component and forms a bond therewith on resolidifying after melting. Solder (7) is interposed between the layer (5) and the other component (1) to form, on resolidification after melting, bonds with the material of the layer (5) and the other component (1). A coating (11) of a further material between the layer (5) and the solder (7) is dispersed when the adjacent layer material becomes molten and is not wetted by the solder (7) when molten. On applying heat to a region (15) of the layer using a laser beam, the layer is melted in this region (15) as is the adjacent solder (7) to form, on resolidification of the solder (7) and molten layer material (15), bonds between the solder (7) and the two components (1, 3).

8 Claims, 1 Drawing Sheet

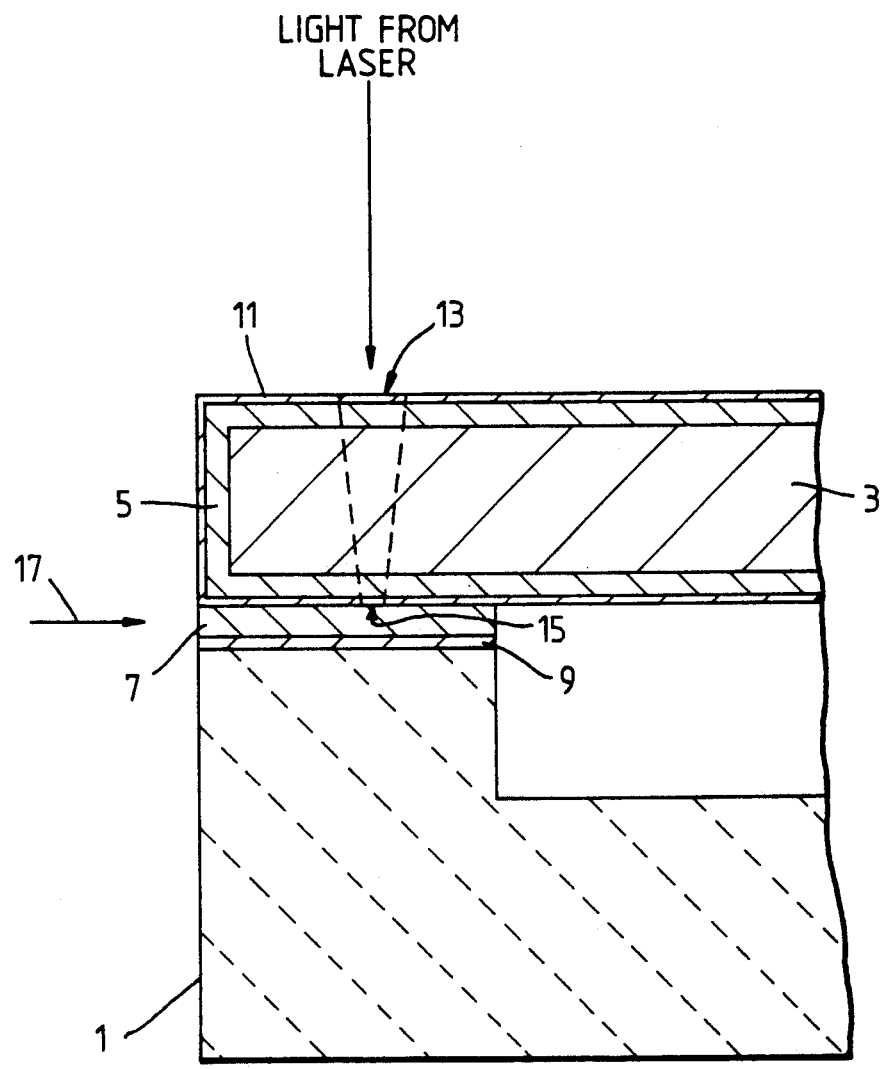

METHODS OF JOINING COMPONENTS

BACKGROUND OF THE INVENTION

1. Field of the Invention

The present invention relates to methods of joining components, and, in particular, to methods of joining components by laser soldering.

2. Description of Related Art

In laser soldering techniques, a solder material is interposed between surfaces of two components to be joined and is melted by heat from a laser beam. If the solder material has a lower melting point than the components to be joined and the surfaces of the components are such that the molten solder can wet them, a good metallurgical bond is formed as the solder solidifies thus joining the components together.

The formation of a good metallurgical bond is not possible if oxide layers or contaminants on the surfaces to be joined prevent the molten solder from wetting those surfaces.

Additionally, the solder material often has a high reflectivity when solid so that heat transfer from a laser beam directed onto the solder takes place slowly.

The use of flux applied to the surfaces to be joined overcomes these problems since the flux removes oxide layers and contaminants and also has a much lower reflectivity than the solid solder material so that laser energy is transferred quickly to the flux and the solder is melted by conduction.

However, the flux residues remaining after the flux has been melted themselves give rise to contamination around the joint between the components. This is a problem where a highly reliable clean joint is required.

One solution to this problem is to coat the components to be joined with a material which is readily wetted by solder. Noble metals, such as gold, are suitable for this purpose since they do not oxidise in air so that flux is not required to remove any oxide layers. However, where laser soldering techniques are to be used, coupling of laser energy to gold is erratic and difficult to control. In addition, when the gold is wetted by solder, wetting continues to take place until all the solder is consumed, or the temperature drops too low to maintain a fluid metal.

Additionally, if the solder spreads beyond the area of the joint, this results in a weakened joint.

SUMMARY OF THE INVENTION

It is an object of the present invention to provide a method of joining components by laser soldering in which some of the problems described above are overcome.

According to the present invention there is provided a method of joining two components by soldering using heat generated by a laser beam comprising: forming on a surface of one component a layer of a material which has a lower melting point than the material of said one component and which will form a metallurgical bond with said surface on resolidifying after melting; interposing a solder material, which has a lower melting point than the material of said layer, between said layer and a surface of the other component which solder material will form, on resolidification after melting in contact with the layer material and the surface of the other components, metallurgical bonds with the layer material and with said surface of said other component; providing, on the surface of said layer adjacent the solder material, a coating of a material which breaks up or otherwise disperses when the adjacent layer material becomes molten and which is not wetted by the solder material when molten; and applying heat to a region of said layer using a laser beam thereby to melt said layer in said region and the adjacent solder material and thereby form, on resolidification of the solder and molten layer material, metallurgical bonds between said solder material and said surface of the other component, between said solder material and region of the layer and between said region of the layer and said surface of said one component.

Preferably, said coating is formed by reaction of the exposed surface of said layer with a reagent. In a preferred embodiment, said coating comprises an oxide coating and said reagent is oxygen contained in the atmosphere.

Alternatively, said coating is provided by applying a material to the exposed surface of said layer.

It will be appreciated that the two laser beams preferably melt the respective layer regions simultaneously.

BRIEF DESCRIPTION OF THE DRAWING

One method and apparatus according to the invention will now be described by way of example with reference to the accompanying drawing which is a cross-sectional view of two components to be joined together prior to heating to effect joining.

DETAILED DESCRIPTION OF THE PREFERRED EMBODIMENTS

Referring to the figure, the components to be joined are a housing 1 formed from alumina and a lid 3 placed over the housing 1 to form a hermetically sealed housing e.g. for electronic components. The lid 3 consists of a metal,e.g. a nickel-cobalt-iron alloy such as Kovar (Registered Trade Mark), having a thermal coefficient of expansion close to that of alumina.

The lid 3 is plated with a layer 5 of a material which melts at a lower temperature than the material of the lid 3 and forms a metallurgical bond therewith on resolidifying. Over the exposed surface of the layer 5, there is an oxide coating 11 formed naturally on exposure to air. A suitable material for the layer 5 is electroless nickel, a nickel phosphorous alloy. A gold layer 9 is formed on the surface of the housing 1 to be joined to the lid 3. A preform 7 of solder, e.g. tin/lead solder, having a melting point below that of the material of the layer 5 and a boiling point greater than the layer material melting point is interposed between the gold layer 9 and the layer 5 on the lid 3.

To join the housing 1 and the lid 3 together, a defocused beam of light from a Nd/YAG pulsed laser is directed onto an area 13 of layer 5 on the surface of the lid 3 which is directly opposite the surfaces which are to be joined together. The energy in the laser beam is sufficient to melt the area 13 of the layer 5, onto which the laser light is directed. The area 13 melts without the material of the lid 3 melting. In addition the heat generated travels through the lid 3 to a region 15 of the layer 5 directly opposite the area 13, which region 15 also melts and forms a metallurgical bond with the lid 3 when allowed to resolidify. Due to absorption of heat by the lid the directly heated area 13 is larger than the region 15 heated by conduction. The dotted lines on FIG. 1 across the lid 3 show the path of heat transfer to the region 15.

The heat conducted to the region 15 in turn melts the solder preform 7 and the molten solder when allowed to resolidify forms a metallurgical bond with the gold layer 9 and the region 15 of the layer 5 where the oxide coating 11 breaks up when the layer 5 becomes molten. Around the region 15 where the layer 5 does not melt, the oxide coating 11 remains intact forming a barrier preventing the molten solder from wetting the layer 5 and forming a metallurgical bond therewith.

It will be appreciated that the gold layer 9 is readily wetted by molten solder 7 since it will not have an oxide layer which forms a barrier preventing wetting by solder.

Instead of melting part of the layer 5 and the solder preform 7 by conduction of heat through the lid 3, part of the layer 5 and the preform 7 can be melted by focussing a laser directly onto part of the exposed edges of the layer 5 and preform 7 as shown by the arrow 17 in FIG. 1.

Slight operational variations in laser soldering may give rise to localised increases of temperature of a heated component. For this reason it is necessary for the melting point of the layer 5 to be well below the melting point of the lid 3 i.e. at least 50° C. and preferably more than 200° C. below that of the lid 3 to avoid the risk of melting the lid 3. In addition, if the solder 7 and the layer 5 melt at similar temperatures, before all the solder 7 provided is molten, regions of the layer 5 other than the region 15 heated by the laser will melt with the result that the coating 11 breaks up over substantially the whole surface of the lid 3. Unless only part of the coating 11 breaks up, the solder 7 will wet a large proportion of the layer 5, thereby weakening the bond formed since the solder is distributed over a larger area. It is therefore necessary for the melting point of the layer 5 to be significantly higher than that of the solder material. The actual required difference will obviously depend on the dimensions of the lid 3 and housing 1 to be joined, the dimensions of the solder 7 and the coating 11 and the specific heat capacities of the materials used. However, the melting point of the layer 5 will not normally be less than 100° C. higher than that of the solder 7 and is preferably at least 200° C. higher.

The layer melting point must however be less than the boiling point of the solder 7. If the layer melting point is too high, once the layer 5 has melted, it will remain molten for only a short period of time due to its small thermal mass. Since the metallurgical bond takes time to form, it is clearly desirable to optimise the time during which the layer 5 is molten. In the described embodiment where the lid 3 is of Kovar, the layer 5 is preferably chosen to have a melting point less than 1200° and thus suitably consists of electroless nickel which has a melting point of 1000° C. to 1200° C., depending on its phosphorous content.

Another advantage of choosing the layer melting point to be relatively low is that less energy from the laser will be required to melt the layer 5. Since it can be difficult to couple sufficient energy to the layer 5 from the laser, the lower the layer melting point, the greater the likelihood that the energy coupled from the laser will be sufficient to melt the layer.

In the described example, the layer naturally produces an oxide coating on its exposed surface, which reacts in an oxygen-containing atmosphere. A sulphide coating could also be produced naturally in a sulphur-containing atmosphere by suitable layer materials, which would serve the same purpose as the oxide coating.

A suitable coating of material could alternatively be applied to the exposed surface of the layer by deposition or other techniques.

Any suitable coating must be thin enough to be broken up on melting adjacent layer material, and the coating material chosen must be one which molten solder does not wet.

It will be appreciated that whilst in the particular embodiment of the invention described by way of example a conventional solder-to-gold metallurgical bond is used to produce a bond between the solder material and the housing 1, in other methods according to the invention other solder bonding techniques may be used instead to effect bonding between the solder material and the other component. Moreover, the bond between the solder material and the other component may, in appropriate circumstances, be effected using the method provided by the invention for producing a bond between the solder material and said one component.

We claim:

1. A method of bonding a first selected portion of a first surface of a first article to a second selected portion of a second surface of a second article which method comprises the steps of:

a) forming on said first surface of said first article a layer of material having a melting point lower than a melting point of said first article, said layer being provided with a coating of a material which is not capable of being wetted by a molten solder and which can be selectively dispersed from any selected region of said layer during heating of the selected region of said layer to its melting point;

b) arranging said first article and said second article such that said first and second selected portions are aligned for bonding and interposing a solder material between said aligned first and second selected portions; and c) thereafter selectively heating by a laser beam said aligned first and second selected portions of said articles to melt a portion of said layer covering said first selected portion and said solder material whereby the coating material is disposed from said portion of said layer and said portion of said layer is wetted by the molten solder material and wherein on ceasing said heating the molten portion of said layer and the molten solder material are solidified and bond said selected first and second portions of the surfaces of said articles.

2. A method according to claim 1 wherein said layer material has a melting point more than 200° C. lower than the material of said first article.

3. A method according to claim 1 wherein said layer material has a melting point not less than 200° C. higher than the melting point of said solder material.

4. A method according to claim 1 wherein said coating is formed by reaction of the exposed surface of said layer with a reagent.

5. A method according to claim 4 wherein said coating comprises an oxide coating and said reagent is oxygen contained in the atmosphere.

6. A method according to claim 5 wherein said layer consists of electroless nickel.

7. A method according to claim 6 wherein said one component consists of a nickel-cobalt-iron alloy material.

8. A method according to claim 1, herein said solder material is a tin/lead solder.

* * * * *